(No Model.) 3 Sheets—Sheet 1.

G. G. F. & J. E. BOSWELL.
CORN HARVESTER.

No. 361,483. Patented Apr. 19, 1887.

Witnesses
V. M. Hood.
M. Carsten.

Inventor
George G. F. Boswell
Joseph E. Boswell.
By their Attorney
H. P. Hood.

N. PETERS. Photo-Lithographer. Washington, D. C.

(No Model.) 3 Sheets—Sheet 2.

G. G. F. & J. E. BOSWELL.
CORN HARVESTER.

No. 361,483. Patented Apr. 19, 1887.

Witnesses
V. M. Hood.
M. Carsten

Inventor
George G. F. Boswell
Joseph E. Boswell
By their Attorney
H. P. Hood.

(No Model.) 3 Sheets—Sheet 3.

G. G. F. & J. E. BOSWELL.
CORN HARVESTER.

No. 361,483. Patented Apr. 19, 1887.

Witnesses
V. M. Hood.
M. Carsten

Inventors:
George G. F. Boswell.
Joseph E. Boswell.
By Their Attorney
H. P. Hood.

UNITED STATES PATENT OFFICE.

GEORGE G. F. BOSWELL AND JOSEPH E. BOSWELL, OF INDIANAPOLIS, INDIANA.

CORN-HARVESTER.

SPECIFICATION forming part of Letters Patent No. 361,483, dated April 19, 1887.

Application filed November 4, 1886. Serial No. 217,943. (No model.)

*To all whom it may concern:*

Be it known that we, GEORGE G. F. BOSWELL and JOSEPH E. BOSWELL, citizens of the United States, residing at Indianapolis, in the county of Marion and State of Indiana, have invented a new and useful Improvement in Corn-Harvesters, of which the following is a specification.

Our invention relates to improvements in a stalk-harvester for which Letters Patent No. 327,649 were issued to G. G. F. Boswell October 6, 1885.

The objects of our improvement are to provide improved means for raising and lowering the reel and to prevent the cut stalks from becoming entangled in the reel, all as hereinafter fully described.

The accompanying drawings illustrate our invention.

Figure 1:
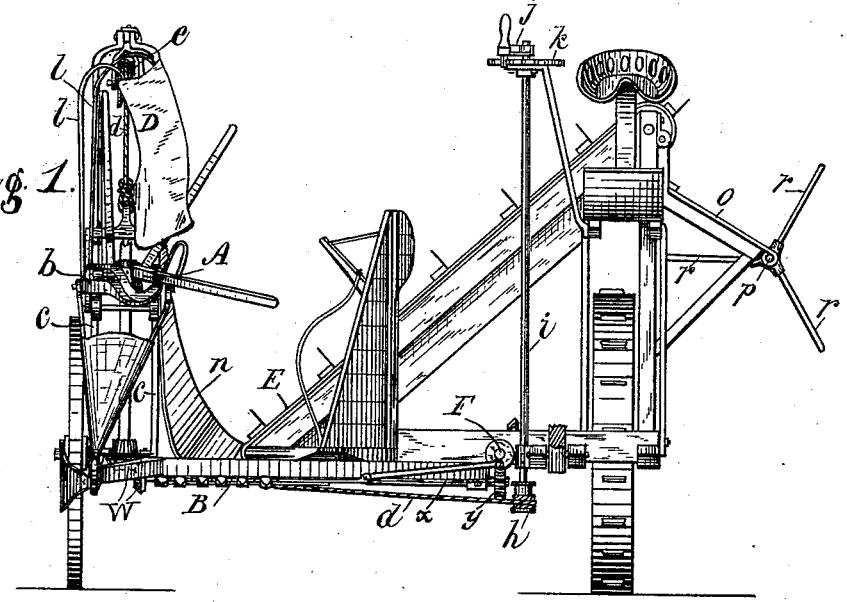
Figure 2:
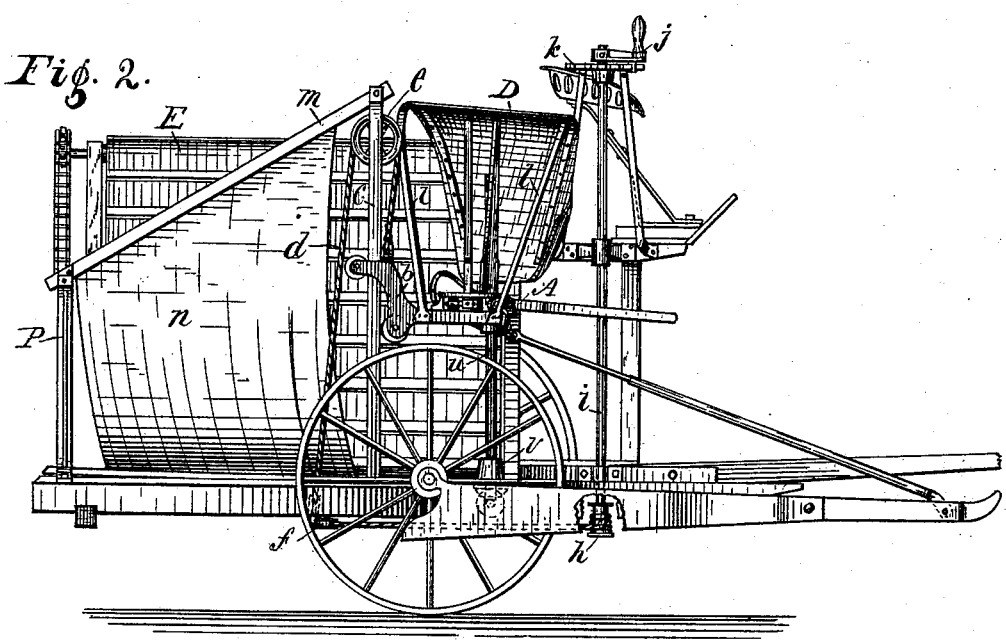
Figure 3:
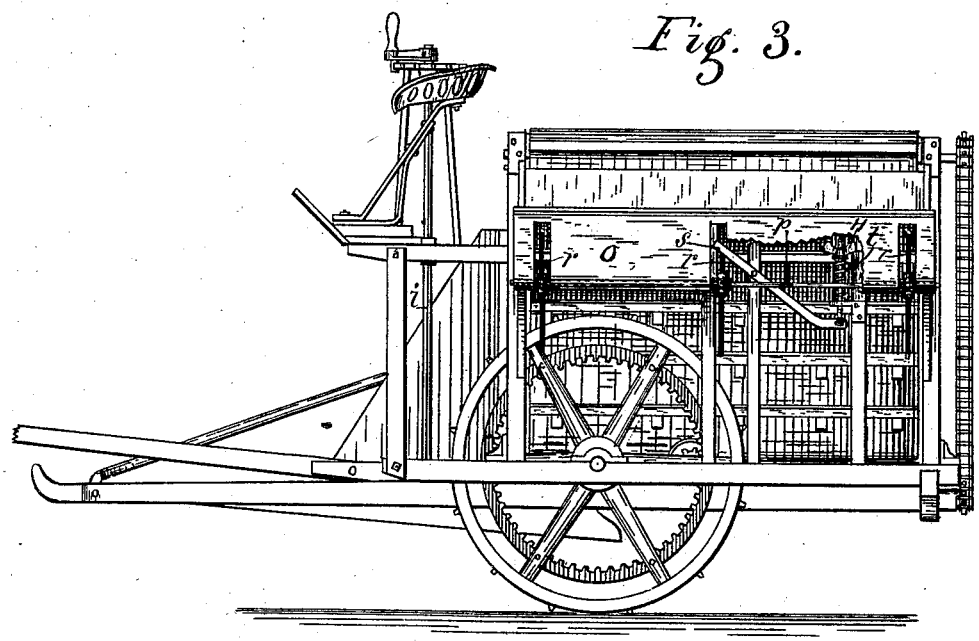
Figure 4:
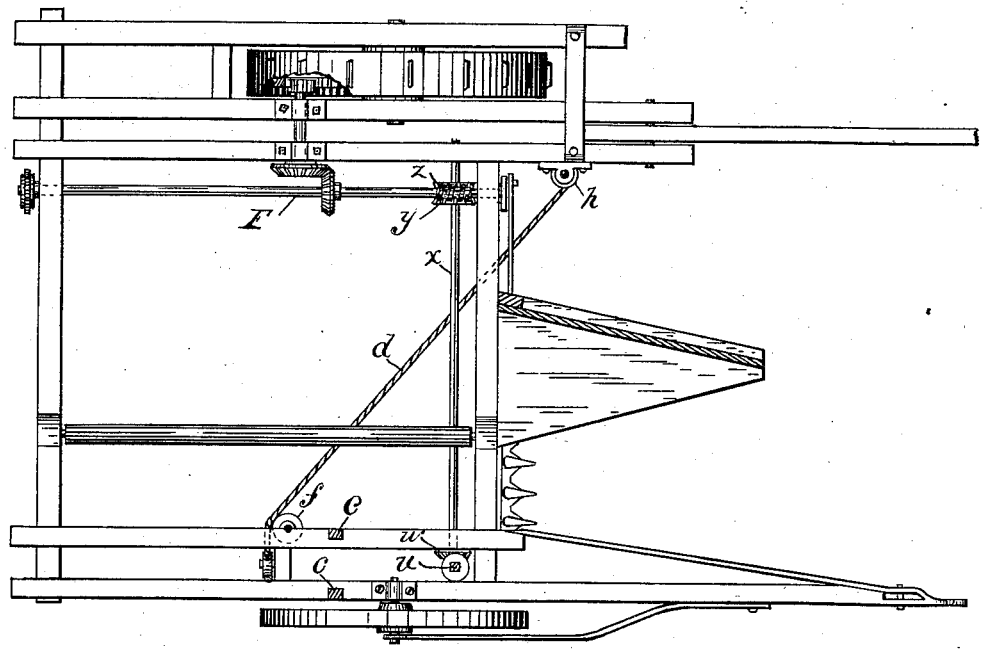

Figure 1 is a front elevation. Fig. 2 is a side elevation. Fig. 3 is an elevation of the side opposite that shown in Fig. 2. Fig. 4 is a plan of the main frame, the elevator and upper work having been removed.

A is the reel for gathering and directing the standing stalks to the cutters. The reel is of a form well known in this class of machines, and is fully described in the above-mentioned Letters Patent. It consists, essentially, of four arms pivoted to a sleeve which is arranged to slide on a vertical shaft and to revolve therewith, said arms having short lateral extensions which move between cam-shaped guides, whereby the arms are caused to move in horizontal and vertical planes during different parts of their revolution. The reel is supported with its guides upon a bracket, $b$, which is mounted so as to slide easily up and down on a pair of upright bars, $c\ c$, which are secured at their lower ends to the main frame of the machine and at their upper ends to a brace, $m$. Bracket $b$ is adjustably secured at any desired height above the main frame by means of a wire cord, $d$, which is fastened to the bracket, and passes from thence upward over a pulley, $e$, suspended between the upper side of bars $c$, thence downward to a guide-pulley, $f$, mounted on the under side of the main frame in line with pulley $e$, and from there horizontally beneath the main frame to a spool, $h$, mounted on the lower end of the vertical shaft $i$.

Shaft $i$ is mounted in suitable bearings secured to the main frame and the seat-frame in such a position that a crank, $j$, secured to the upper end of the shaft is easily reached by the driver of the machine when in his seat. Said crank is arranged to engage a series of notches in a fixed plate, $k$, and is thereby locked at will in any desired position.

In the former machine the reel was mounted on a tilting support, so as to stand at different inclinations with the main frame at different elevations, and there was no means whereby the height of the reel might be changed when the machine was in motion. By this improved construction the height of the reel is at all times under complete control of the driver, and the reel-support remains parallel with the main frame at all times.

For the purpose of preventing the stalks, after being swept toward the sickle B, from becoming entangled in the arms of the reel, we secure to the outer edge of bracket $b$ two bent rods, $l\ l$, which rise a sufficient distance to clear the reel-arms when vertical, and then bend inward and downward, to form supports for a sheet-metal shield, D, behind which the reel-arms pass as they begin to rise, as clearly shown in Figs. 1 and 2.

For the purpose of conducting the cut stalks to the elevator, we secure to the brace $m$, at one end to the upright bars $c\ c$ and at the other end to a post, P, erected on the rear outer corner of the main frame, and to the main frame, a sheet-metal apron, $n$, which is inclined and bent, as shown, to form one side of a trough, of which the elevator E forms the other side. The horizontal conveyer-belt before used is by this means dispensed with. The dumping mechanism consists of an inclined table, $o$, arranged to receive the stalks from the elevator, and having a shaft, $p$, mounted in its outer edge so as to revolve freely therein.

Secured to shaft $p$ are three series of arms, $r\ r\ r$. Pivoted to one of the uprights of the frame which support the outer raised end of the elevator F is a catch-bar, $s$. One end of said bar is arranged to lie in the path of the arms *r* of one of the series, so that as the arms turn outward they are intercepted in succession by the said end of the catch-lever. The catch-lever is held in a position to intercept and temporarily retain the arms *r* by a spring, *t*, one end of which is secured to the frame and the other end engages the catch-lever. The arrangement of catch-bar *s* and arms *r* is such that when one of the arms is engaged by the catch-bar other arms project at about a right angle with the table *o*, so as to retain the stalks deposited thereon until their weight shall overcome the tension of spring *t*, thereby raising the free end of the catch-bar and releasing the arm held thereby, the spring returning the catch-bar into the path of the arms *r*. Shaft *p* will then turn till another arm is engaged by the catch-bar and the bundle of stalks is discharged. The tension of spring *t* may be varied by nut H. A square vertical shaft, *u*, is mounted so as to revolve in a bearing, *v*, secured to the main frame. Said shaft passes loosely through a correspondingly-shaped hole in the reel, and motion is given to the reel and the shaft by means of a pair of bevel-gears, *w*, shaft *x*, carrying a screw-gear, *y*, and screw *z* on the shaft F, which drives the sickle.

We claim as our invention—

1. In a stalk-harvester, the combination, with the main frame, the vertical guide-bars *c c*, and the bracket *b*, carrying the reel A, and mounted so as to slide on said bars, of pulley *e*, secured to said bars above the bracket, pulley *f*, mounted on the main frame below and in line with pulley *e*, vertical shaft *i*, mounted on the frame near the driver's seat, crank *j*, secured to the upper end of the shaft, spool *h*, secured to the lower end of the shaft, and cord *d*, attached to the bracket and passing over pulleys *e* and *f* to spool *h*, all arranged to co-operate substantially in the manner specified, whereby the position of the bracket and reel may be conveniently controlled by the driver of the machine, substantially as set forth.

2. In a stalk-harvester, the combination, with the gathering-reel and the vertically-adjustable support on which the reel is mounted, of the shield D, attached to said support and arranged to cover the reel-arms during a part of their movement, substantially as and for the purpose specified.

GEORGE G. F. BOSWELL.
JOSEPH E. BOSWELL.

Witnesses:
H. P. HOOD,
V. M. HOOD.